(12) United States Patent
Cobiski et al.

(10) Patent No.: US 6,824,732 B2
(45) Date of Patent: Nov. 30, 2004

(54) BLOW PIN ASSEMBLY

(75) Inventors: Richard J. Cobiski, Westborough, MA (US); Emanuel E. Wohlgemuth, Condado (PT)

(73) Assignee: Ultraseal Technologies Corporation, Worcester, MA (US)

(*) Notice: Subject to any disclaimer, the term of this patent is extended or adjusted under 35 U.S.C. 154(b) by 55 days.

(21) Appl. No.: 10/143,584

(22) Filed: May 10, 2002

(65) Prior Publication Data

US 2002/0172735 A1 Nov. 21, 2002

Related U.S. Application Data (60) Provisional application No. 60/291,004, filed on May 15, 2001.

(51) Int. Cl.[7] .......................... B29C 49/50; B29C 49/76
(52) U.S. Cl. ...................... 264/533; 264/536; 425/525; 425/527; 425/535
(58) Field of Search .............................. 264/533, 536; 425/525, 527, 535; B29C 49/50, 49/76

(56) References Cited

U.S. PATENT DOCUMENTS

| | | | |
|---|---|---|---|
| 3,806,300 A | | 4/1974 | Hafele et al. ............... 425/525 |
| 4,032,278 A | * | 6/1977 | Kuenzig et al. ............ 425/525 |
| 4,225,303 A | * | 9/1980 | Crisci ......................... 425/525 |
| 4,234,299 A | * | 11/1980 | Kuenzig et al. ............ 425/527 |
| 4,390,338 A | | 6/1983 | Bowers et al. .............. 425/525 |
| 4,497,622 A | | 2/1985 | Grebowiec .................. 425/525 |
| 4,497,623 A | | 2/1985 | Beuscher .................... 425/525 |
| 4,631,020 A | | 12/1986 | Frankenberg et al. ....... 425/527 |
| 4,753,591 A | | 6/1988 | Maes et al. ................. 425/525 |
| 5,629,032 A | * | 5/1997 | Pennino ...................... 425/527 |
| 5,795,598 A | | 8/1998 | Wohlgemuth et al. ...... 425/525 |

\* cited by examiner

*Primary Examiner*—Robert B. Davis
(74) *Attorney, Agent, or Firm*—Hoffmann & Baron, LLP (57) ABSTRACT

A blow pin assembly is provided for inflating a parison and forming the neck portion of a plastic container in a blow molding apparatus. The blow pin assembly is mountable to a blow rod. It includes a blow pin body including an exterior surface having a tapered portion and a cutting edge beneath the tapered portion. The tapered portion cooperates with the master seal of the mold to automatically center the assembly before the cutting edge engages the shear steels to sever the blow molded article from the mold. The cutting edge adjoins a rim extending substantially perpendicularly from the blow pin body, and can be resharpened one or more times.

26 Claims, 7 Drawing Sheets

BLOW PIN ASSEMBLY

This application claims benefit of Provisional 60/291,004, filed May 15, 2001.

BACKGROUND OF THE INVENTION

1. Field of the Invention

The field of the invention relates to assemblies, such as blow pin assemblies, which are used in blow molding machinery for inflating parisons and forming the necks of containers manufactured by such machinery.

2. Brief Discussion of the Prior Art

The blow molding of plastic containers is well known and practiced worldwide. Blow molding offers many advantages over other forms of container manufacturing.

These advantages include the ability to produce containers at minimal cost and with minimal waste; the low start-up costs and mold making lead times in comparison to other manufacturing methods, such as injection molding; the ability to produce irregular shaped and hollow containers; the ability to produce containers quickly and automatically; the ability to produce containers from a variety of materials having qualities suited to the specific application.

Blown containers having specially formed neck finishes are commonly employed for use with container closures. Neck finishes may be threaded for use with threaded closures, adapted for mating with snap-on closures, etc. It is common within a container blow mold system to employ a main mold to form the container reservoir, and a neck block, or top block, to form the neck finish. Top blocks are also made to standard dimensions so that the parting face of the top block and main mold properly match. The main mold is usually adapted to interchangeably accept any standard top block for a particular container size or style.

The first pair of components mounted to the top block are the neck finish blocks. Each neck finish block is usually made of aluminum, and may originally be formed as a circular body. The circular body is cut in half to form the neck finish block for each half of the mold. The neck finish blocks are machined to provide threads, ratchet teeth, shoulders or other surface features on the container which are used to engage or otherwise accommodate a closure.

During blow molding, a parison of molten plastic is extruded between the open mold halves, then the mold system closes to entrap the parison within the mold cavity. A hollow blow pin, which is ordinarily made of tool steel, is inserted through the neck opening, and into the parison where it inflates the parison with pressurized air to cause the parison to form to the shape of the container and neck finish cavity. The blow pin includes a hardened steel bushing, or shear bushing, having an annular blade, and each top block half includes a semi-circular hardened steel blade, or shear steel.

The shear steel shapes and trims flash from the top end of the bottle neck. By providing various degrees of precision ground undercut to the bottom surfaces of the shear steels, a distinct radius can be formed at the upper edge of the bottle neck area. This can improve the strength of the bottle neck in this critical area. Shear steels are made of precision ground and hardened steel.

When the mold is closed, the semi-circular blades and seals form annular orifices around the shear bushing. During molding, portions of the parison extending beyond the mold cavity are trapped between the parting faces of the mold halves and become unwanted flash. After the container is formed within the cavity and before the mold system reopens to release the blow molded container, the shear bushing is retracted through the shear steel orifice. The shear bushing and shear steels are sized and shaped so that the retraction causes a shearing of the container opening through the neck, whose diameter is that of the shear bushing blade and shear steel orifice. After the molded container is removed from the mold, flash is removed by trimming in an automated process.

The last set of components which are mounted to the top block are the master seals, which are sometimes referred to as masters. These components provide a seal for the blow pin, thereby preventing air from escaping from the mold when the parison is inflated to form the container. They also form a "flash pocket" which pinches and seals the parison when the molds close at the start of the production cycle. When all neck finish components, i.e. the neck finish block, the shear steel and the master seal, have been mounted to the top block halves, they are then secured thereto with four Allen cap screws or the like. Failure to do so can prevent the mold from closing properly, leading to damage or even destruction of the neck finish components and/or blow pin. U.S. Pat. No. 5,589,204, the disclosure of which is incorporated by reference herein, discloses a mold assembly including a top block assembly which facilitates alignment of the neck finish components with the mold parting line.

The slightest misalignment of the blow pin assembly within the mold will impose undue wear upon the blow pin assembly shearing edge and/or the shear steel as they cooperate to shear the container, thereby causing frequent replacement and sharpening. Such wear occurring at the blow pin assembly shear edge and/or the shear steel is a primary reason for blow molding process down-time and maintenance. Additionally, the dulling of the shear edge and the shear steel will result in uneven formation of the neck edges which will prevent proper release of the container from the mold, and cause ineffective sealing of the container cap. Therefore, it is of the utmost importance that effective and clean shearing of the container neck occur as the blow pin assembly is withdrawn from the mold cavity.

Alignment of the blow pin assembly during the shearing operation of the molding process is important in reducing the maintenance required for the blow pin assembly and the down-time of the machinery. Such alignment has traditionally been accomplished by employing a blow pin having a beveled F surface or chamfer that adjoins the shear edge thereof. More recently, a blow pin has been developed that includes a beveled surface or chamfer closer to its upper end. This surface will be guided by the master.

SUMMARY OF THE INVENTION

It is an object of the invention to provide a blow pin assembly which effectively shears the plastic in the neck portion of a container formed in a blow molding machine, and which reduces the amount of maintenance; required using most existing assemblies.

It is another object of the invention to provide a blow pin assembly that effectively forces plastic to the sealing lip area of the molded bottle.

In accordance with the above objects of the invention, a blow pin and an assembly including a blow pin are provided for inflating a parison and forming the neck portion of a plastic container in a blow molding apparatus. The assembly includes a blow pin which is mountable to a blow rod. The blow pin includes a blow pin body including an exterior surface having a tapered portion and a cutting edge beneath the tapered portion. The tapered portion cooperates with the master seal of the mold to automatically center the blow pin before the cutting edge engages the shear steels to sever the blow molded article from the mold. The cutting edge of the blow pin forms substantially a ninety degree angle with the longitudinal axis of the blow pin. Such a configuration provides effective cutting as well as allowing the cutting edge to be resharpened one or more times. The frequency of blow pin replacement is accordingly reduced.

In the preferred embodiment, the blow pin includes a heat sink for removing heat from the blow pin body. As described in U.S. Pat. No. 5,795,598, the heat sink is preferably positioned within an internal cavity of the blow pin body and includes a plurality of flow passages therein to facilitate heat dissipation. Preferably, the blow pin body is made from a durable material, such as tool steel, and the heat sink is made from a material having high heat transfer properties, such as aluminum.

In order to force plastic to the sealing lip area of a molded bottle, a blow pin body is provided that includes upper and lower portions and a groove or recess between these portions. A plurality of air passages extend through the groove or recess.

DETAILED DESCRIPTION OF THE INVENTION

The present invention is described below as used in conjunction with the blow molding of a container having a threaded finish. This disclosure is in no way intended to limit the invention to use with only thread finish containers, and the modification of the invention for use with other blown containers will be readily apparent to one skilled in the art given the following detailed description.

Figure 1:
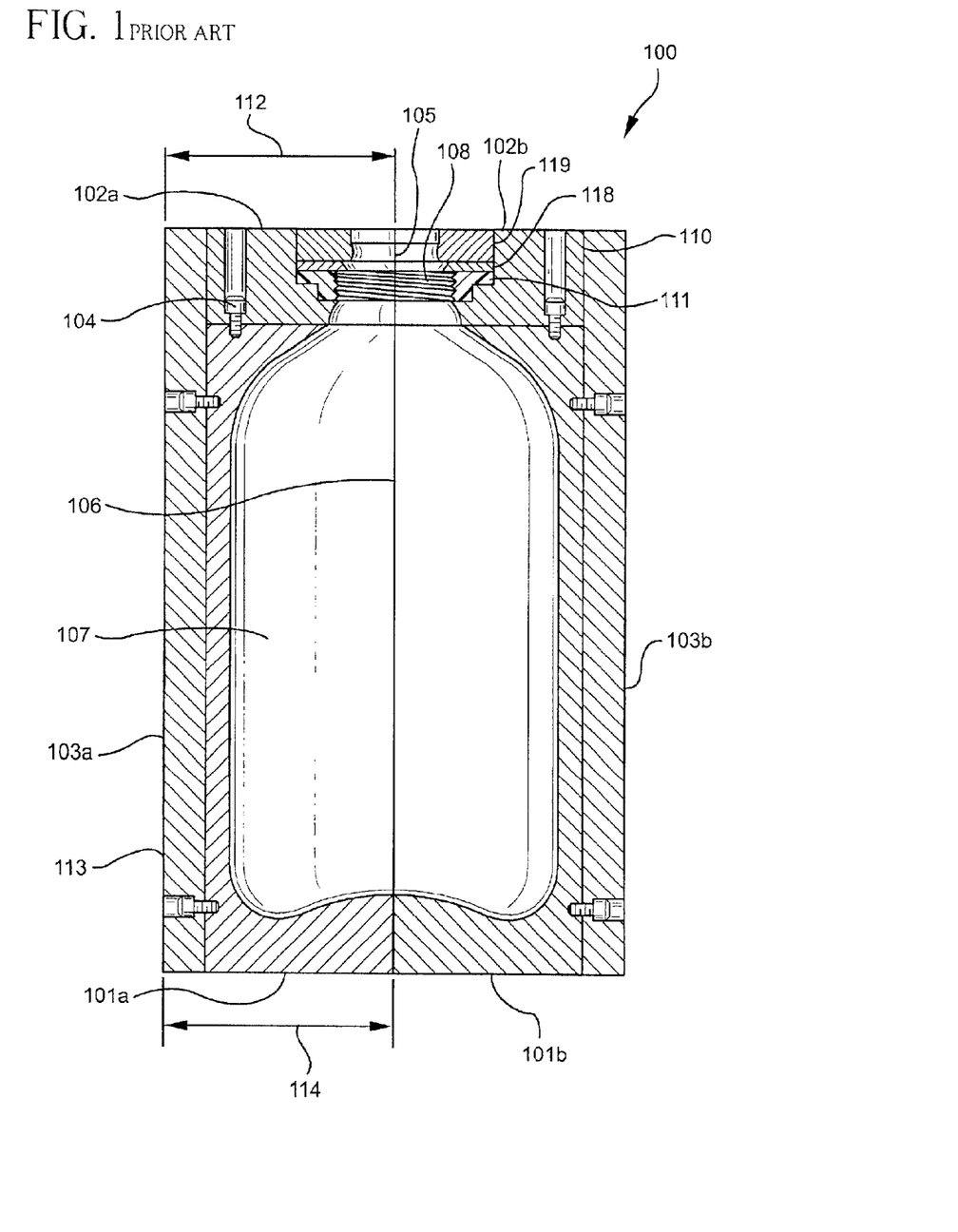
FIG. 1 is a cross-sectional view of a blow mold for use with the blow pin assembly of the present invention.

Referring now to the drawings, FIG. 1 shows a typical mold system, designated by reference numeral 100. The mold system 100 is comprised of two main mold halves 101A and 101B, two top block halves 102A and 102B, and two back plates 103A and 103B. One main mold half 101A is affixed to the back plate 103A which in turn is mounted within an extrusion blow-molding machine. The top block half 102A is affixed atop one of the main mold halves 101A by machine bolts 104 through screw-holes 117 such that the top block parting face 105 is aligned with the main mold parting face 106. The opposing main mold and top block halves are similarly assembled, with further attention that the matching mold halves and top blocks mate properly to each other. A reservoir cavity 107 is formed by the mating of the mold halves such that a container may be formed therein. Such machinery is in widespread use today for manufacturing plastic containers filled with milk, juice or water. U.S. Pat. No. 4,234,299, which is incorporated herein by reference, contains a discussion of blow molding machinery of this type.

The container formed by the mold of FIG. 1 includes a reservoir portion and a neck portion. The neck portion includes helical threading therearound. The mating top block halves form a thread cavity 108 for forming the container neck threading therein. Each top block half comprises base portion 110 to which a neck finish insert 111, a shear steel 118, and a master seal 119 are mounted. The neck finish inserts, shear steels and master seals are removable from the top block halves for interchangeability and replacement.

After assembly and alignment, the top block parting face 105 must be precisely aligned with the main mold parting face 106 to ensure proper molding and minimal mold wear. In order to accomplish this, the top plate depth 112, measured from back mounting surface 113 of the back plate 103A to top block parting face 105, must be equal to the main mold depth 114, equivalently measured. Further, the parting faces must each be held parallel to the back plate.

Figure 2:
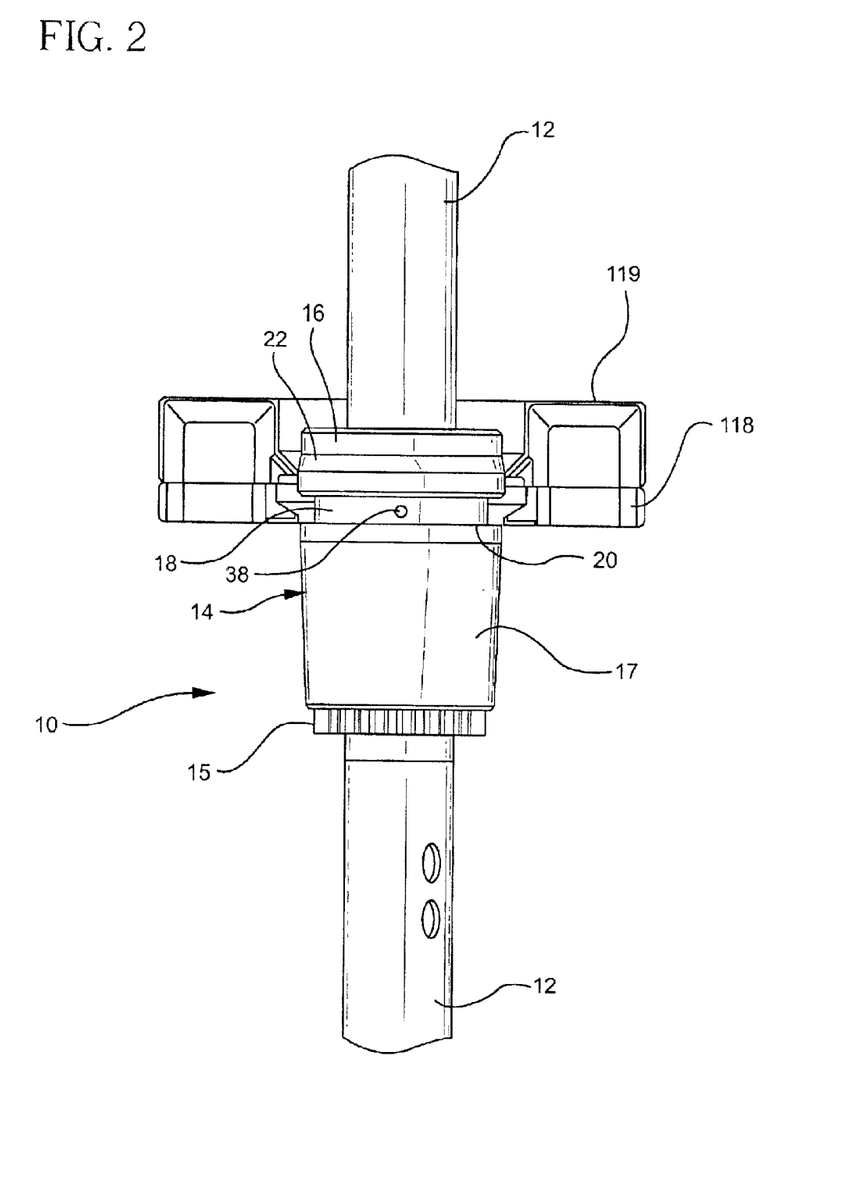
FIG. 2 is a side plan view of the blow pin of the present invention along with one half of the master seal and one half of the shear steel aligned therewith.

FIG. 2 shows a blow pin assembly 10 positioned within one half of the master seal 119 and one half of the shear steel 118. The blow pin assembly 10 in accordance with this preferred embodiment of the invention is adapted for mounting to a blow rod 12. It and the blow rod 12 together form an assembly for inflating a parison (not shown).

The blow pin assembly 10 is comprised in part of a blow pin body 14. The exterior surface of the blow pin body is divided into two operative sections, an upper portion 16 and a lower portion 17. The blow pin assembly 10 includes a heat sink 15 for removing heat from the blow pin. The heat sink is positioned within an internal cavity of the blow pin body and includes a plurality of flow passages therein to facilitate heat dissipation. The blow pin body 14 is made from a durable material, such as tool steel. The heat sink is made from a material having high heat transfer properties, such as aluminum.

The upper portion 16 and the lower portion 17 of the blow pin body 14 are divided by a groove or recess 18. The upper portion 16 and the lower portion 17 may be separate pieces which are assembled together, or preferably are integrally molded as a single article. A shearing member in the form of an annular cutting edge 20 is defined by the exterior surface of the lower portion 17 of the blow pin body. While the shearing member is preferably integral with the blow pin body, it may be formed as a separable member.

During the blow molding operation, a parison is formed around the blow pin assembly 10 and blow rod 12. The parison, the blow pin assembly and the blow rod are placed between the two mold halves 101A and 101B. The blow pin assembly is moveably positioned between an up and a down position within a first passage defined by the inner surfaces of the opposing set of master seals 119 and a second passage defined by the inner surfaces of the opposing pairs of shear steels 118. The diameter of the cutting edge 20 is sized so as to approximate the inner diameter of the second passage.

Figure 5:
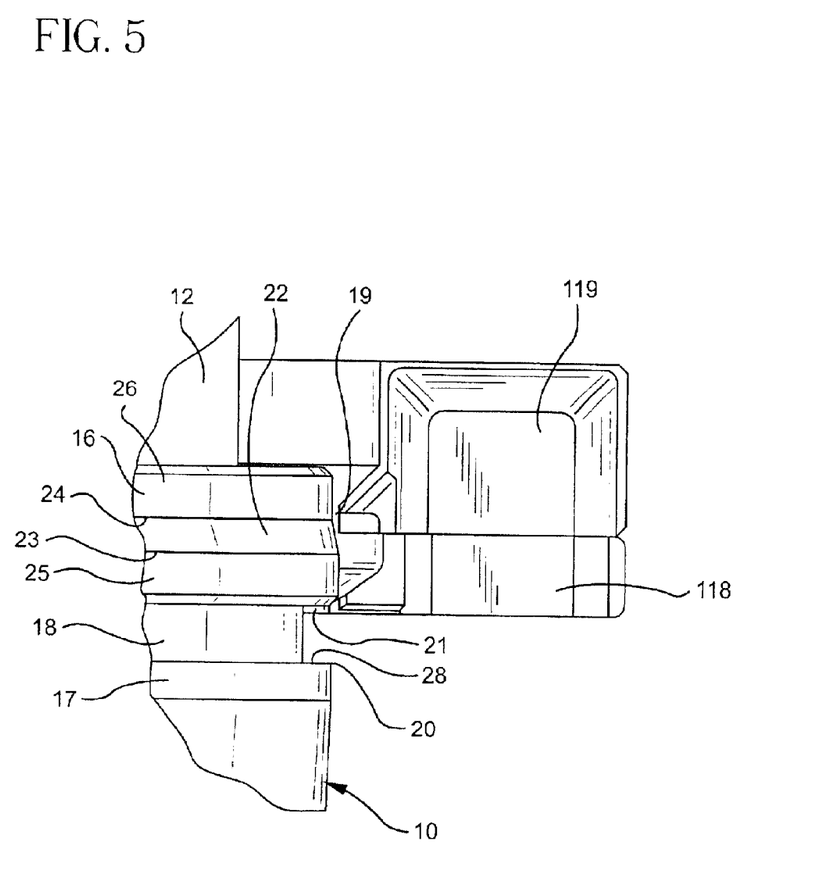
FIG. 5 is an enlarged view of a portion of FIG. 2, wherein the blow pin of the present invention is in the down position.

When the blow pin assembly 10 is in the down position, as shown in FIG. 5, the exterior surface of upper portion 16 of the blow pin body, and the inner surface 19 of the master seal 119, entrap the plastic above the neck portion of the parison therebetween to form a seal. With the seal in place, the parison is then inflated into the desired container shape by the injection of air through the blow rod 12.

Figure 6:
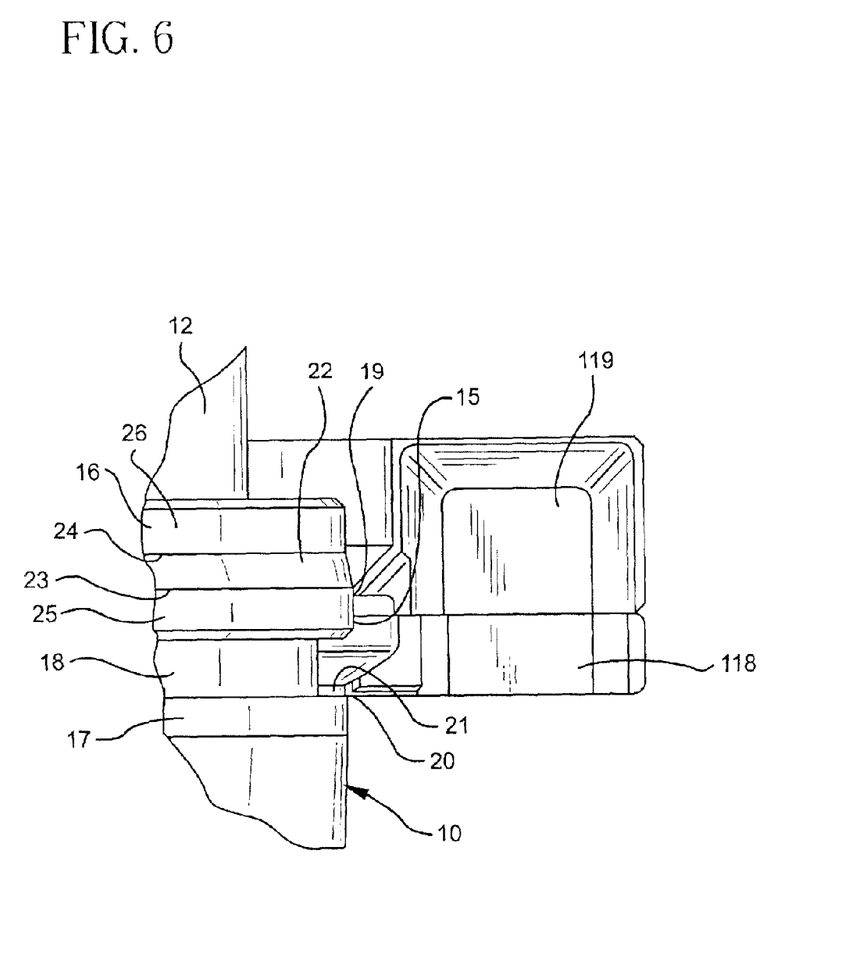
FIG. 6 is an enlarged view of a portion of FIG. 2, wherein the blow pin of the present invention is in the up position.

After the container is fully formed, the blow pin assembly 10 is moved into the up position shown in FIG. 6. The movement of the blow pin assembly 10 into the up position causes the cutting edge 20 of the lower portion 17 of the blow pin body to cooperate with the inner surface of the shear steel 118 to sever the container at the neck. This severing forms the area on the neck upon which a subsequently applied closure effects a seal, and also allows the container to be removed from the mold. As stated above, if the blow pin assembly 10 is misaligned within the mold, the step of severing the container at the neck will not be effectively accomplished, and typically results in the premature wear of the cutting edge 20 of the blow pin body and the inner surface of the shear steel 118. Therefore, in order to properly align the cutting edge 20 and the inner surface of the shear steel 118, the upper portion 16 of the blow pin body is provided with a guide.

As can be seen clearly in FIGS. 3–6, the guide is formed by providing the exterior surface of the upper portion 16 of the blow pin body with a tapered portion 22. The tapered portion 22 is located above the cutting edge 20 on the exterior surface of the blow pin body 14. The tapered portion 22 is angled so as to increase in diameter in the direction of the cutting edge 20, thereby forming a substantially conical section. The angle of taper of the tapered portion 22 as measured from the largest diameter edge 23 to the smallest diameter edge 24 is preferably about five degrees.

As seen in FIGS. 5–6, the tapered portion 22 enables a misaligned blow pin assembly 10 to automatically center itself during its movement into the up position before the cutting edge 20 engages the inner surface 21 of the shear steels 118. As the blow pin assembly 10 is moved from the down position into the up position, the tapered portion 22 contacts the inner surfaces 19 of the master seals 119. As the blow pin 10 is moved toward the up position, the contact between the tapered portion 22 and the inner surface 19 of the master seal 119 will move the blow pin 10 to the center of the mold thereby aligning the cutting edge 20 and the inner surface 21 of the shear steels 118. This automatic centering enables efficient severing of the container at the neck without the need for the shear steels 118 or the cutting edge 20 to first contact each other and cause premature wear.

The largest diameter edge 23 of the tapered portion 22 is bound by a substantially cylindrical portion 25 having a diameter which is substantially equal to that of the largest diameter edge 23 of the tapered portion 22. The cylindrical portion 25 is sized so as to be slightly smaller than the inner diameter of the first passage defined by the inner surface 19 of the master seals 119. This slightly smaller diameter enables the blow pin assembly 10 to move freely between the up and the down positions. In addition, the cylindrical portion 25 is positioned and sized in relation to the cutting edge 20 so that, when the cylindrical portion 25 is located between the master seals 119, the blow pin assembly 10 is centered relative to the mold, and the cutting edge 20 is aligned with the inner surface 21 of the shear steels 118. Further, it will be evident that, in order to provide proper alignment before severing, the length of the tapered portion 22 is such that the master seals 119 engage the cylindrical portion 25 before the cutting edge 20 engages the inner surfaces 21 of the shear steels 118 to sever the container at the neck.

In the preferred embodiment, as shown in FIGS. 5 and 6, the tapered portion 22 is bound on either end by a substantially cylindrical portion. In other words, the largest diameter edge 23 of the tapered portion 22 is bound by the first substantially cylindrical portion 25 having a diameter substantially equal to that of the largest diameter edge 23 of the tapered portion 22, and the smallest diameter edge 24 of the tapered portion 22 is bound by a substantially cylindrical portion 26 having a diameter substantially equal to that of the smallest diameter edge 24 of the tapered portion 22.

The use of the tapered portion 22 on the upper portion 16 of the blow pin assembly 10 results in an advantageous apparatus which automatically aligns the cutting edge 20 of the blow pin 10 with the shear steels 118 of the mold. Additionally, the use of the tapered portion provides for decreased wear on the blow pin because the cutting edge and the shear steels do not contact each other for a proper alignment before severing. These factors, among others, lead to the decreased maintenance of a blow pin, and the resultant decrease in blow molding machinery down-time. They further allow the cutting edge 20 to be optimally configured for effectively trimming the plastic and to be easily reconditioned as wear occurs.

Figure 7:
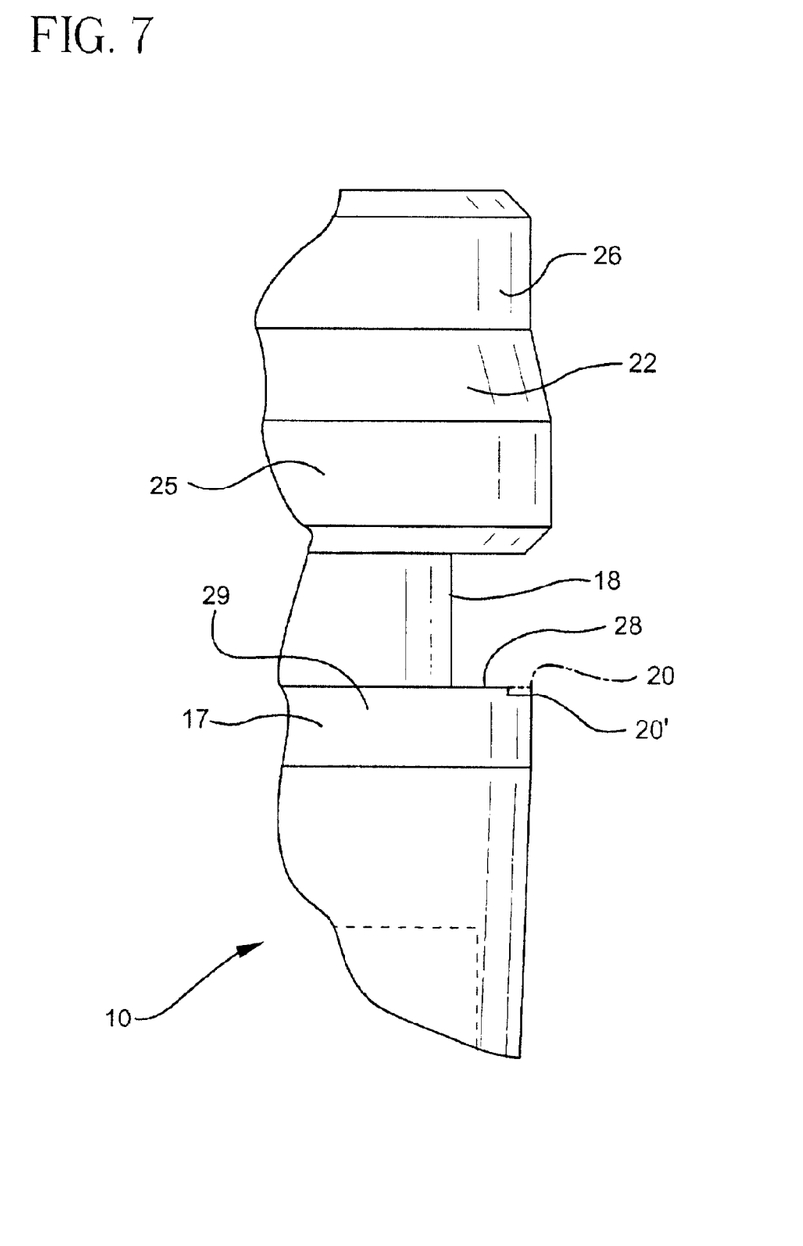
FIG. 7 is an enlarged side elevation view of a resharpened cutting edge of the blow pin.

Referring to FIGS. 3–6, the blow pin body 14 includes an annular cutting edge 20 formed at the junction of the outer wall of the lower portion 17 of the body 14 and an annular rim 28 extending from the grooves or recess 18. The annular rim 28 is substantially perpendicular to the longitudinal axis of the blow pin body 14 while the outer surface 29 of the blow pin body 14 adjoining the rim is substantially parallel to this axis. As manufactured, the cutting edge 20 is sufficiently sharp to effectively sever the blown container at the neck. Wear occurring at the cutting edge 20 or shear steel 118 over time must be addressed as it will result in uneven formation of the neck edges and/or improper release of the container from the mold. While the blow pin assembly 10 could be replaced, the present invention allows it to be resharpened one or more times before replacement is required. As shown in FIG. 7, the outer portion of the rim 28 is ground such that a new cutting edge 20' is formed slightly below the plane of the rim. As only a small amount of material must be removed, the cutting edge preferably may be reground several times before replacement of the blow pin assembly becomes necessary. Such resharpening is much less practical where the surface adjoining the cutting edge is chamfered, such as disclosed in U.S. Pat. No. 5,795,598.

Figure 4:
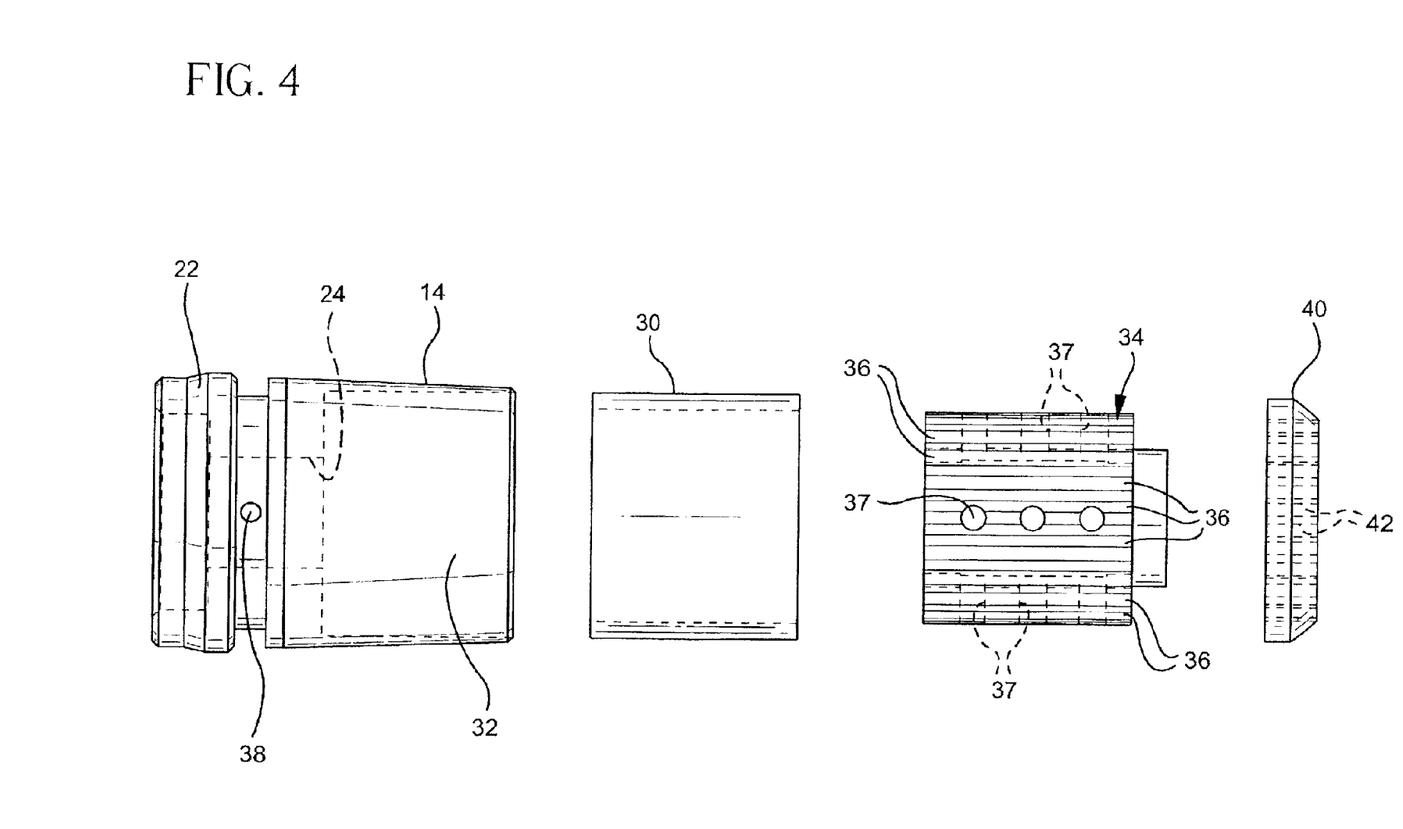
FIG. 4 is an exploded, side elevation view of a blow pin assembly in accordance with the invention.

The blow pin assembly 10 in accordance with the preferred embodiment includes several elements that enhance its effectiveness. These include a relatively durable blow pin body 14 that is made from tool steel or the like and a heat sink 15. The heat sink is comprised of a sleeve 30 that is press fit into the cavity 32 of the blow pin body and a finned member 34. Both the sleeve and finned member are preferably made from aluminum. The fins 36 of the finned member 34 engage the inner surface of the sleeve 30. Heat can accordingly be transferred from the sleeve to the finned member by conduction. A vented cap 40 is mounted to the heat sink, and includes openings 42 for allowing air to enter the flow passages of the heat sink. An axial passage (not shown) extends through the cap to accommodate the blow rod. A similar arrangement of elements is disclosed in U.S. Pat. No. 5,795,598.

An annular chamber (not shown) is formed between the outer surface of the blow rod 12 and the inner surface of the finned member 34. Radially extending flow passages 37 communicate with this chamber, and enhance the ability of the heat sink to draw heat from the blow pin body.

Figure 3:
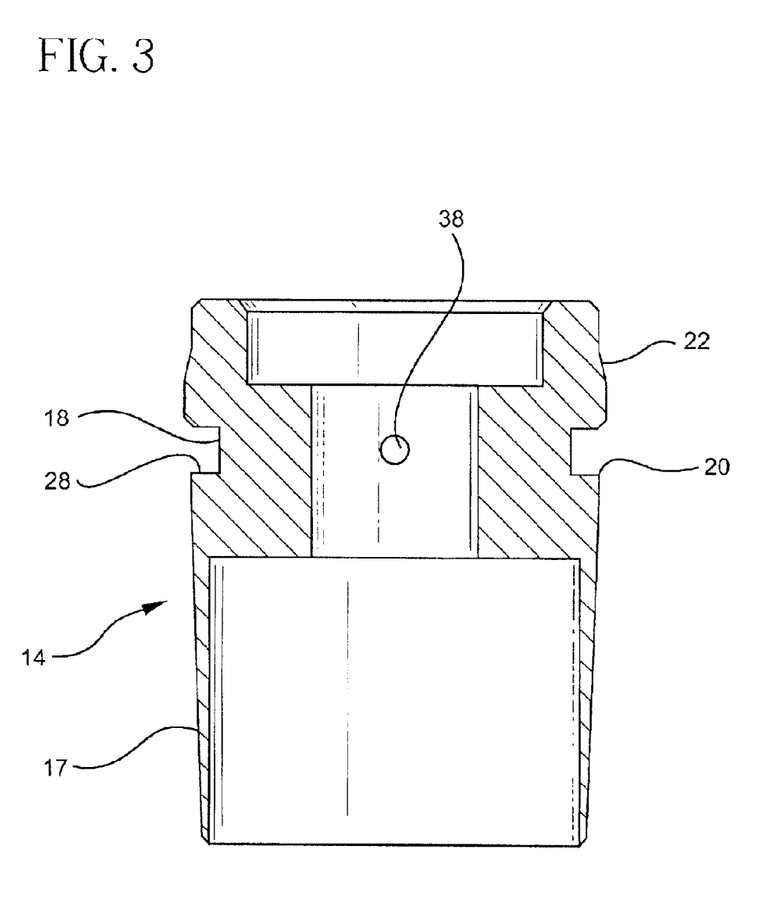
FIG. 3 is a sectional view of a blow pin body in accordance with the invention.

A plurality of air passages 38, preferably four in number and equally spaced, extend through the blow pin body 14 in the area of the recess 18. These air passages help force plastic to the sealing lip area of the container (not shown) during the molding process. Each passage 38 is about one-sixteenth of an inch in diameter.

It will be appreciated that the present invention could be employed in connection with blow pin assemblies that do not include heat sinks as described above. Such blow pin assemblies may, for example, be made substantially or entirely of tool steel. As blow pin assemblies having a heat sink as described above or other features that enhance performance may be more expensive than such assemblies lacking these features, the invention provides greater cost savings when more expensive blow pin assemblies are employed.

The principles of the invention can be applied to blow pins having a variety of configurations for producing container necks of various sizes and shapes. The constructions of blow pin assemblies in accordance with the invention can accordingly be tailored to individual blow molding machines and the containers to be produced in such machines.

What is claimed is:

1. An assembly for severing a neck portion of a blow-molded container, comprising:
   a set of opposing master seals defining a first passage;
   a pair of opposing shear steels defining a second passage, said second passage being aligned with said first passage; and
   a blow pin assembly extending through said first and second passages and moveable therein along an axis between up and down positions, said blow pin including an exterior surface having a tapered portion and a cutting edge located beneath said tapered portion, said cutting edge approximating the inner diameter of said second passage and adjoining a rim extending substantially perpendicularly with respect to said axis, said rim having an upwardly facing surface, said tapered portion increasing in diameter in the direction of said cutting edge, said cutting edge adjoining said shear steels when said blow pin is in the up position, said tapered portion being in opposing relation to said set of opposing master seals when said blow pin assembly is moved from the down position to the up position such that said master seals can guide said blow pin assembly as it moves towards the up position.

2. An assembly as described in claim 1 wherein said tapered portion of said blow pin assembly is substantially conical and said cutting edge is substantially annular.

3. An assembly as described in claim 2 wherein said blow pin assembly includes a substantially cylindrical portion adjoining and extending below said tapered portion.

4. An assembly as described in claim 2 wherein said blow pin assembly includes a substantially cylindrical surface adjoining said rim.

5. An assembly as described in claim 2 wherein said blow pin assembly includes a blow pin body and a heat sink positioned within said blow pin body, said rim and cutting edge being integrally formed by an exterior surface of said blow pin body.

6. An assembly as described in claim 5 including an annular recess extending within said blow pin body, said upwardly facing surface of said rim bounding said recess.

7. A blow pin assembly comprising:
   a blow pin body having a longitudinal axis and including an upper portion, a lower portion, a recessed portion between said upper and lower portions, and a passage extending therethrough, said upper portion including an upper surface portion and a lower surface potion;
   a substantially conical exterior surface formed between said upper and lower surface portions on said upper portion of said blow pin body and increasing in diameter in the direction of said lower portion;
   a substantially annular rim integral with said lower portion of said blow pin body and bounding said recessed portion, said rim extending substantially perpendicularly to said longitudinal axis of said blow pin body and having an outer edge defining a cutting edge; and
   an annular exterior surface formed on said lower portion of said blow pin body and adjoining said cutting edge.

8. A blow pin assembly as described in claim 7 wherein said annular exterior surface adjoining said cutting edge is substantially cylindrical.

9. A blow pin assembly as described in claim 8 including a heat sink positioned within said passage for drawing heat from said cutting edge.

10. A blow pin assembly as described in claim 8 wherein said lower surface potion of said upper portion of said blow pin body includes a substantially cylindrical exterior surface portion adjoining and extending below said substantially conical exterior surface and said substantially conical exterior surface has an angle of taper of about five degrees.

11. A blow pin assembly as described in claim 10 wherein said substantially cylindrical exterior surface portion of said upper portion of said blow pin body bounds said recessed portion.

12. A blow pin assembly as described in claim 7 including an annular notch in said rim, said notch including an outer annular edge defining said cutting edge.

13. A method of aligning a blow pin assembly during operation of a mold system including two main mold halves, two top block halves, a master seal and a shear steel mounted to each top block half, and a blow pin assembly including an annular cutting edge and a guide, comprising:
    causing said blow pin assembly to move upwardly with respect to said master seals and said shear steels such that said guide contacts an inner surface of said master seal and centers said blow pin assembly, thereby aligning said annular cutting edge and said inner surfaces of said shear steels.

14. The method of claim 13 wherein said guide includes a tapered portion, including moving said blow pin assembly upwardly such that said tapered portion contacts said inner surfaces of said master seals.

15. The method of claim 14 wherein said blow pin assembly includes a substantially cylindrical portion that is slightly smaller in diameter than the diameter formed by said inner surfaces of said master seals, including moving said blow pin assembly such that said substantially cylindrical portion is positioned between said master seals.

16. The method of claim 15 wherein said substantially cylindrical portion engages said master seals prior to engagement of said annular cutting edge and said shear steels.

17. A method of aligning a blow pin assembly during operation of a mold system including two main mold halves, two top block halves, a master seal and a shear steel mounted to each top block half, each master seal having an inner surface, and a blow pin assembly including an annular cutting edge and a guide, comprising:
    causing said blow pin assembly to move along an axis with respect to said master seals and shear steels such that said guide contacts said inner surfaces of said master seals and centers said blow pin assembly.

18. The method of claim 17, wherein said guide includes a tapered portion, including moving said blow pin assembly such that said tapered portion contacts said inner surfaces of master seals.

19. An assembly for severing a neck portion of a blow-molded container, comprising:
  a set of opposing master seals defining a first passage;
  a pair of opposing shear steels defining a second passage, said second passage being aligned with said first passage; and
  a blow pin assembly extending through said first and second passages and moveable up and down therein along an axis, said blow pin assembly including an exterior surface including a guide and a cutting edge, said cutting edge approximating the inner diameter of said second passage, said cutting edge adjoining said shear steels when said blow pin is in a first position, said guide being positionable in opposing relation to said set of opposing master seals when said blow pin assembly is moved along said axis such that said master seals can guide said blow pin assembly as it moves along said axis.

20. An assembly as described in claim 19, wherein said guide includes a tapered portion and said cutting edge is substantially annular.

21. An assembly as described in claim 20 wherein said blow pin assembly includes a substantially cylindrical portion adjoining said tapered portion.

22. An assembly as described in claim 20 wherein said guide is engageable with said master seals for centering said cutting edge with respect to said shear steels.

23. An assembly as described in claim 20 wherein said cutting edge is integral with said blow pin assembly.

24. An assembly as described in claim 23 wherein said blow pin assembly includes first and second substantially cylindrical surface portions positioned, respectively, above and below said guide, said tapered portion of said guide having an angle of taper of about five degrees.

25. An assembly as described in claim 1 wherein said rim and cutting edge are integral with said blow pin body and said tapered portion has an angle of taper of about five degrees.

26. A method as described in claim 17 wherein said cutting edge is an integral part of said blow pin assembly, including causing said annular cutting edge to engage said shear steels following contact of said guide and said master seals.

* * * * *

UNITED STATES PATENT AND TRADEMARK OFFICE
CERTIFICATE OF CORRECTION

PATENT NO. : 6,824,732 B2  
DATED : November 30, 2004  
INVENTOR(S) : Cobiski et al.

It is certified that error appears in the above-identified patent and that said Letters Patent is hereby corrected as shown below:

Column 2,  
Line 47, now reads "having a beveled F surface", and should read -- having a beveled surface... --.  
Line 56, now reads "maintenance; required", and should read -- maintenance required... --

Signed and Sealed this

Seventeenth Day of May, 2005

JON W. DUDAS  
*Director of the United States Patent and Trademark Office*